United States Patent [19]
Badenhorst

[11] Patent Number: 5,873,778
[45] Date of Patent: Feb. 23, 1999

[54] MOTOR VEHICLE INTERIOR WITH A CENTRAL JET MOUNTED IN A DASHBOARD

[75] Inventor: Sean Badenhorst, Auckland, New Zealand

[73] Assignee: Mercedes-Benz AG, Germany

[21] Appl. No.: 624,898

[22] Filed: Mar. 27, 1996

[30] Foreign Application Priority Data

Mar. 27, 1995 [DE] Germany ..................... 195 11 133.8

[51] Int. Cl.⁶ ................................................. B60H 1/34
[52] U.S. Cl. ............................................................ 454/155
[58] Field of Search .......................... 454/75, 155, 315, 454/320

[56] References Cited

U.S. PATENT DOCUMENTS 4,377,107  3/1983  Izumi ..................................... 454/155
5,259,814  11/1993  Weissbrich et al. ...................... 454/75

FOREIGN PATENT DOCUMENTS

| 8617831 | 6/1988 | France . |
| 9603671 | 3/1998 | France . |
| 37 30 467C2 | 3/1989 | Germany . |
| 8906221 | 5/1990 | Germany . |

*Primary Examiner*—Harold Joyce
*Assistant Examiner*—Derek S. Boles
*Attorney, Agent, or Firm*—Evenson, McKeown, Edwards & Lenahan, P.L.L.C.

[57] ABSTRACT

A motor vehicle interior is provided with a central jet located in a dashboard. An air state sensor located in the vehicle interior is subjected to the flow of air blown out of the central jet in the dashboard. The horizontal and vertical air guide systems are connected to one another by mechanical forced guidance to limit their movement possibilities so that they sweep a maximum blowing-out area that avoids the roof area provided with the air state sensor.

1 Claim, 3 Drawing Sheets

5,873,778

MOTOR VEHICLE INTERIOR WITH A CENTRAL JET MOUNTED IN A DASHBOARD

BACKGROUND AND SUMMARY OF THE INVENTION

The invention relates to a motor vehicle interior with a central jet of a heating and/or air-conditioning system located in a dashboard and having at least one outlet duct. The jet has a movable horizontal and a movable vertical air guide system in the exit area of the outlet duct for controlling the blowing direction, as well as an air state sensor located in a roof area of the interior for regulating the heating and/or air-conditioning system.

A motor vehicle is known from German Patent 37 30 467 C2 whose interior is supplied by a ventilating system. This ventilating system has a central jet in a central area of a dashboard, from which jet the air from a heating and/or air-conditioning system can be blown into the interior. Such a central jet has a horizontal and a vertical air guide arrangement which are adjustable by means of suitable control elements in a horizontal and in a vertical plane. In a roof area of the interior, behind a rear-view mirror or in the vicinity of a roof operating unit, an air state sensor is mounted to detect the state of the interior air. As a result, it may be located in the area over which the central jet blows. With increasing tilt of the windshield, the sensor is displaced increasingly further into the area over which the central jet blows, especially when the air stream is directed upward, so that it can sometimes detect incorrect temperature values.

An object of the invention is to provide a motor vehicle interior of the type referred to above, whose air state sensor always detects real interior temperatures so that the vehicle interior can be temperature-controlled precisely and reliably by the heating and/or air-conditioning system.

This object is achieved according to preferred embodiments of the invention by the horizontal and vertical air guide systems being linked with one another by mechanical forced guidance to control their movement so that they cover a maximum blowing area that avoids the roof area provided with the air state sensor. The vertical air guide system according to the invention is an air guide system that has vertically aligned air guide elements and thus conducts air in a vertical plane. Conversely, the horizontal air guide system is responsible for the size of the horizontal outward flow area of the air. The invention prevents air blown directly out of the central jet from flowing over the air state sensor and delivering inaccurate values for regulating the heating and/ or air-conditioning system.

By disposing the air state sensor in the flow area of the central jet, as is the case in the prior art, only the air state values of the air flow that has just left the central jet are detected. However, this frequently does not correspond to the state of the air in the interior, especially when the interior temperature is to be increased or decreased. If it is relatively cool inside the vehicle, the air blown out through the central jet to increase the interior temperature must be much warmer than the air already in the interior. However, if the air state sensor is subjected to the direct flow of this warm air, the heating and/or air-conditioning system will be turned down again in response to the values it detects, although the desired temperature has by no means yet been reached in the interior. The same problem occurs in the opposite case, when a relatively warm interior is to be cooled by the air-conditioning system. According to the invention, the movements of the horizontal and vertical air guide systems are limited in such fashion that the interior area in which the air state sensor is mounted is not subjected to the direct flow of the air as it is blown out. Therefore, the actual state of the air in the interior can be detected reliably by means of this air state sensor. Incorrect or falsified regulation of the interior air by the heating and/or air-conditioning system is avoided.

In certain preferred embodiments of the invention, the forced guidance of a guide element is associated with the vertical air guide system and coupled with the horizontal air guide system, said element limiting the pivoting movement of the horizontal air guide system upward in a pivot range of the vertical air guide system at the level of the air state sensor to an upper marginal outflow area located beneath the roof area. As a result, by means of a simple mechanical solution, the horizontal air guide system is controlled in a functionally reliable fashion such that the air guided through this air guide system does not reach the roof area and the air state sensor.

In another embodiment of the invention, the guide element is mounted on a pivotable air guide element of the vertical air guide system and has a helical rise curve that abuts one corner of an air guide element of the horizontal air guide system. This is an especially simple design, since the pivoting movements of the two air guide systems are utilized directly to achieve a forced linkage between the two air guide systems.

Other objects, advantages and novel features of the present invention will become apparent from the following detailed description of the invention when considered in conjunction with the accompanying drawings.

DETAILED DESCRIPTION OF THE DRAWINGS

Figure 1:
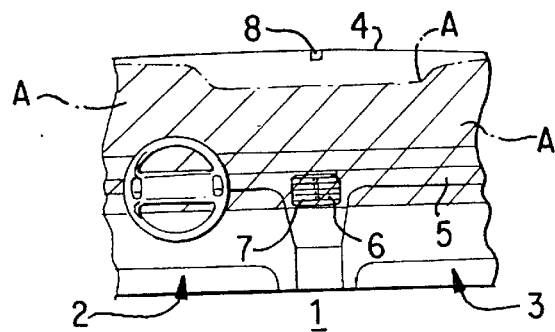
FIG. 1 is a schematic diagram of an interior of an automobile constructed according to a preferred embodiment of the invention, with a dashboard mounted in the interior being provided in a central area with a central jet of a heating and/or air-conditioning system.
Figure 2:
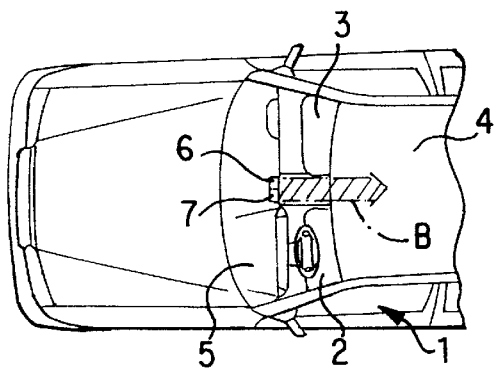
FIG. 2 is a schematic top view of the interior according to FIG. 1 in the area of the dashboard, with the air guide systems of the central jet being aimed in such fashion that an outflow area marked by the broad arrow is achieved.
Figure 3:
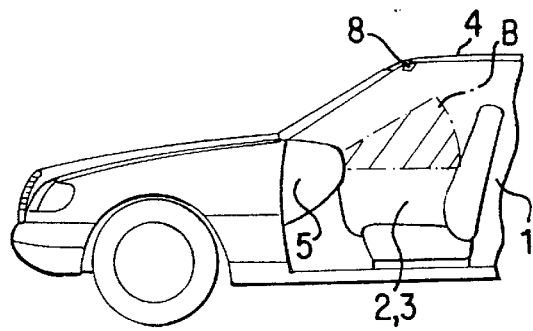
FIG. 3 is a side view of the interior according to FIG. 2 from which the vertical extent of the outflow area according to FIG. 2 can be seen.

According to FIGS. 1 to 5, an automobile has an interior (1) with a driver area (2) and a front seat passenger area (3).

The vehicle interior (1) is delimited at the top by a root (4). At its front, vehicle interior (1) has a dashboard (5) in which a plurality of outflow jets of a ventilation system are provided for a heating and/or air-conditioning system. Only the two middle outflow ducts (6 and 7) in dashboard (5) are critical to the present invention, said ducts being located approximately in the middle of the vehicle in the central area of dashboard (5). The two outflow ducts (6 and 7), in their outlet areas that empty into vehicle interior (1), each have two air guide systems described in greater detail below with reference to FIGS. 6 to 9. The outlet areas of the two outflow ducts (6 and 7) including the corresponding air guide systems will be referred to as the central jet.

Each outflow duct (6, 7) has a vertical air guide system (9, 10, 14) as well as a horizontal air guide system (12, 13, 15). Each of the two vertical air guide systems (9, 10, 14) is provided with a plurality of vertical louvers (9), which as a rule are arranged parallel to one another and vertically distributed at equal intervals over the width of each outflow duct (6, 7), aligned in each outflow duct (6, 7). Each vertical louver (9) is pivotable in the vicinity of its anterior edge around a pivot axis (14) aligned approximately vertically in outflow duct (6, 7). Vertical louvers (9) of each outflow duct (6, 7) are connected together at their rear ends by means of a link (10), by means of which they are adjustable by a common pivoting movement by equal amounts in outflow duct (6, 7). All vertical louvers (9) are arranged parallel to one another and therefore are pivotable in parallel with one another. The opposite end positions of the maximum pivot ranges of vertical louvers (9) of each vertical air guide system can be seen in FIGS. 6 and 8. By virtue of the vertical air guide system (9, 10, 14) in each outflow duct (6, 7), the air emerging from outflow ducts (6, 7) is therefore capable of being distributed in an approximately horizonal plane, inward and outward in interior (1). Vertical air guide systems (9, 10, 14) therefore deflect the outflowing air laterally.

Each outflow duct (6, 7) has in its outlet area, in the flow direction in the vicinity of the outer end of each outflow duct (6, 7), and therefore behind vertical air guide systems (9, 10, 14), a horizontal air guide system (12, 13, 15), through which the air emerging from outflow ducts (6, 7) can be distributed upward and downward in vehicle interior (1), in other words approximately in a vertical plane. Each horizontal air guide system (12, 13, 15) as a rule has a plurality of horizontal louvers (12) arranged at uniform distances above one another, said louvers being mounted to pivot at their front edges around a horizontal pivot axis (13) in the side walls of each outflow duct (6, 7). Like vertical louvers (9), horizontal louvers (12) as a rule are also aligned parallel to one another, connected by a common control slide (15), and pivotable together by equal amounts.

By means of the horizontal and vertical air guide systems of the central jet, air heated or cooled by a heating and/or air-conditioning system is blown into vehicle interior (1), with the temperature of the air blown into vehicle interior (1) being regulated electronically by the heating and/or air-conditioning system. In order to determine the current state of the air in vehicle interior (1), an air state sensor (8) is located on roof (4) of vehicle interior (1) in the vicinity of a rear-view mirror mounted on roof (4) or in the vicinity of a roof operating unit. This air state sensor (8) transmits the current temperature values to the corresponding control unit in the heating and/or air-conditioning system, which compares these values with the set values and heats or cools the air blown into vehicle interior (1). In order to prevent air state sensor (8) from delivering falsified values during a desired change in the state of the air in vehicle interior (1), but without the position of air state sensor (8) in vehicle interior (1) having to be changed, the outflow area of the central jet at the level of the air state sensor (8, FIG. 1) is limited in such fashion that it does not affect air state sensor (8). Air state sensor (8) on roof (4) of the vehicle interior (1) is therefore not subjected to the air blown out of the central jet.

However, since the pivotability of horizontal louvers (12) in both outflow ducts (6, 7) is suitable in any case for blowing air into the roof area at the level of air state sensor (8), the pivotability of horizontal louvers (12) is limited as a function of the position of the corresponding vertical louvers (9). The invention has determined that it is sufficient, in order to block the flow directed at the roof area at the level of air state sensor (8), to limit the pivotability of horizontal louvers (12) only in those outflow portions in which, because of the position of vertical louvers (9), flow over air state sensor (8) would actually occur. The pivotability of horizontal louvers (12) upward is therefore forcibly linked to the position of vertical louvers (9). For a maximum outflow area (A) (FIG. 1), produced by the respective opposite end positions of the vertical and horizontal air guide systems, the curve shown shaded in FIG. 1 results.

Figure 4:
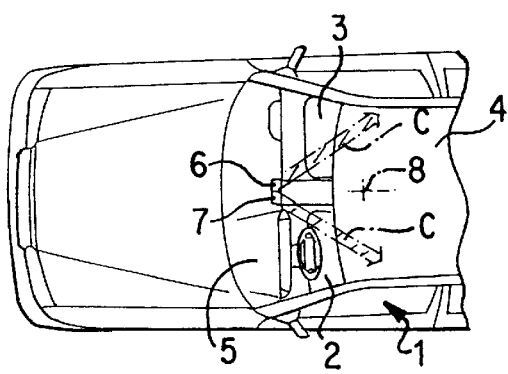
FIG. 4 is a top view of the interior according to FIG. 2, in which the air guide systems of the central jet are so arranged that the outflow areas corresponding to the arrows directed diagonally upward result.
Figure 5:
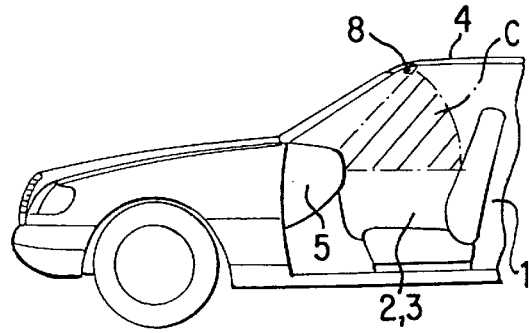
FIG. 5 shows the interior according to FIG. 4 in a side view, from which the vertical extent of the outflow areas shown in FIG. 4 can be seen.
Figure 6:
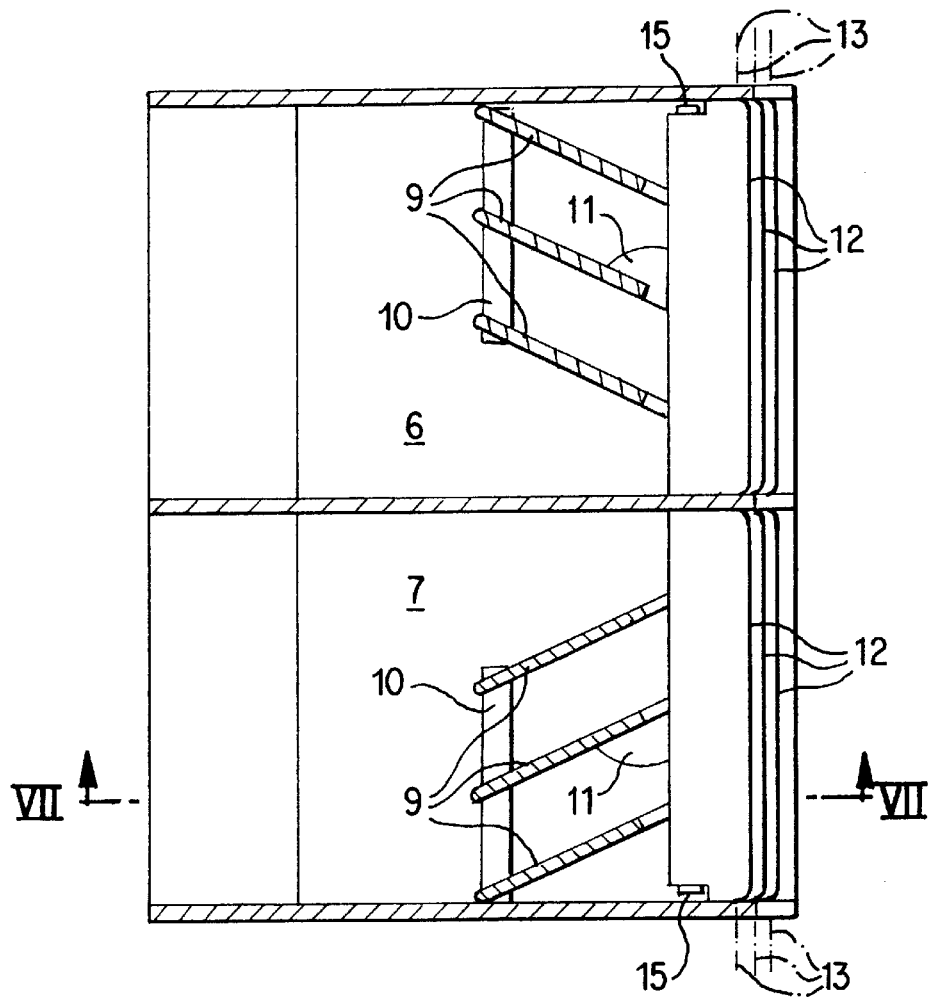
FIG. 6 is a cross section through the central jet in the dashboard according to FIG. 1.
Figure 7:
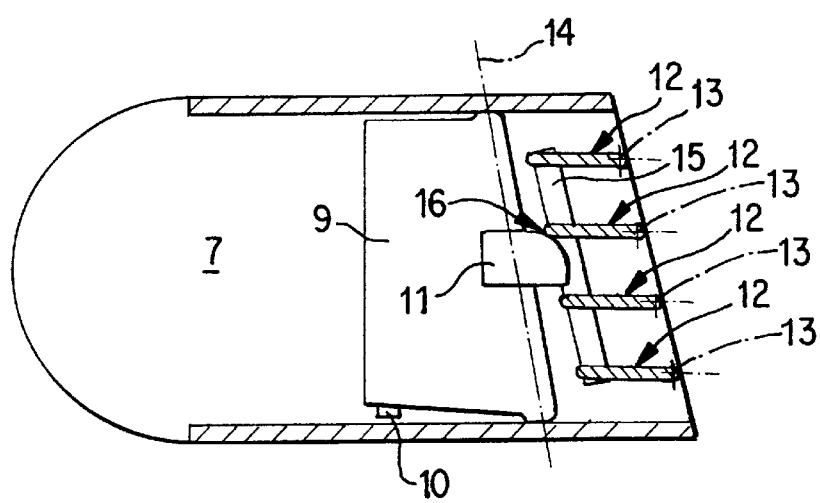
FIG. 7 is a lengthwise section through the central jet according to FIG. 6 along sectional plane VII—VII in FIG. 6.
Figure 8:
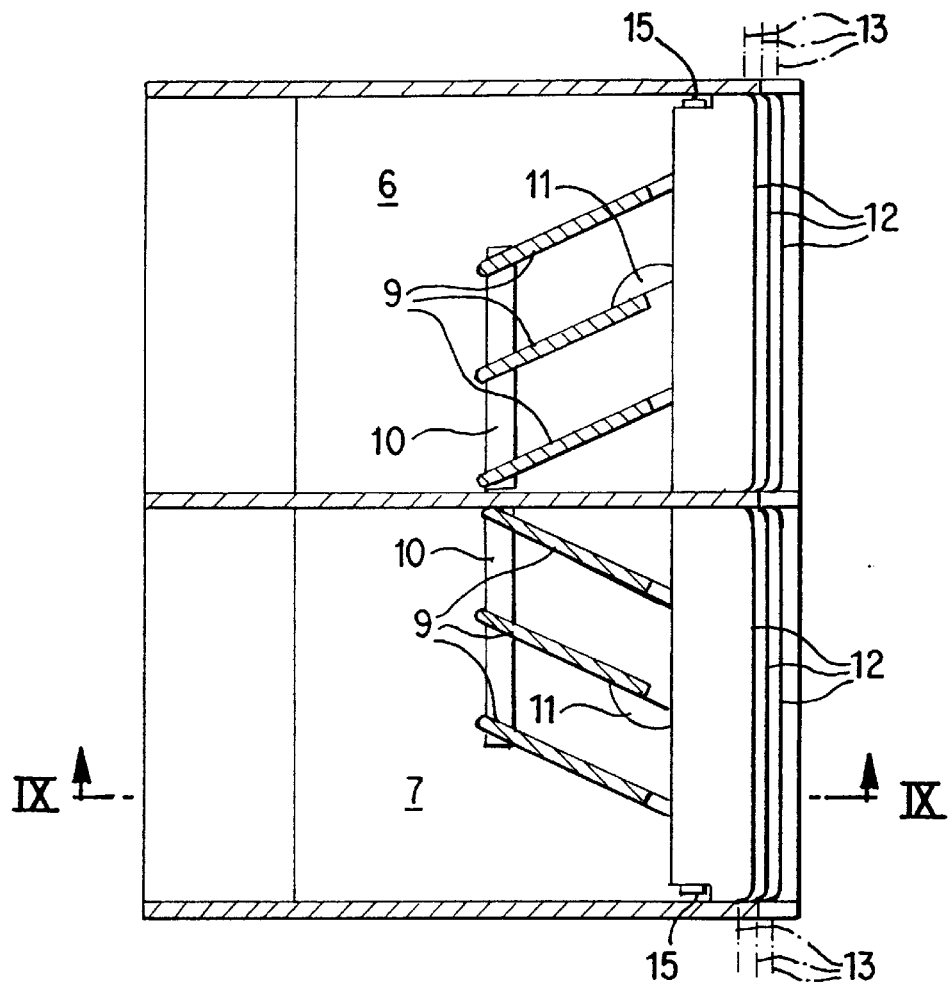
FIG. 8 shows a cross section through the central jet according to FIG. 6, in which however the air guide systems are shown in positions other than those in FIGS. 6 and 7.
Figure 9:
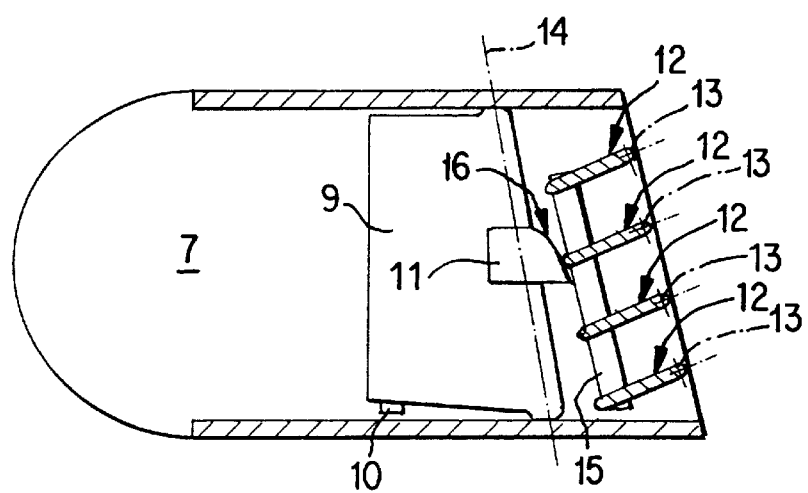
FIG. 9 is a lengthwise section through the central jet according to FIG. 8 along sectional plane IX—IX in FIG. 8.

As a forced guide, on the respective central vertical louver (9) of each vertical air guide system, a wedge-shaped guide element (11) is molded which fits at the front beneath a rear edge of a horizontal louver (12). Guide element (11) has a rise curve (16) that runs helically and coaxially with respect to pivot axis (14). The inclined plane thus formed, in the end position of vertical louver (9) in which it is directed laterally inward (FIGS. 6 and 7), prevents a pivotability of horizontal louvers (12) upward, with rise curve (16) supporting from below the associated horizontal louver (12) in a position in which it is aligned approximately horizontally. In this position, the air stream flowing out of outflow duct (6, 7) cannot be deflected upward. Instead, only a pivoting movement of the horizontal louvers that causes the outflow to be directed downward is possible. This position of the vertical and horizonal air guide systems, linked with one another, is explained in FIGS. 2 and 3. The outflow area that can be produced in this position is marked (B) In the opposite end position of vertical louvers (9) (FIGS. 8 and 9) in which vertical louvers (9) conduct the air from outlet ducts (6, 7) laterally outward, the lower end of the inclined plane formed by rise curve (16) is below the end of the corresponding horizontal louver (12). As can be seen from FIG. 9, guide element (11) does not limit the pivotability of horizontal louvers (12) in this position, so that the air flow can then be deflected upward unimpeded. The outflow areas (C) that can be produced in this position are shown in FIGS. 4 and 5. The outflow areas marked (B) and (C) mark the opposite end positions when vertical louvers (9) of the vertical air guide system are pivoted. Because of rise curve (16), however, there is also a smooth continuous transition in the intermediate areas to the upper limit of the outflow area. To delimit the upper marginal outflow area of horizontal louvers (12) by means of guide element (11) over the width of interior (1), the resultant V-shaped upper marginal curve of maximum outflow area (A) according to the section shown in FIG. 1 is obtained.

The air guidance possibilities of the central jet described above can be limited at relatively low cost. It is merely necessary to provide the middle vertical louvers (9) in each outflow duct (6, 7) with the corresponding guide element (11), which is either molded during manufacture of vertical louvers (9) when they are made of plastic, or is connected permanently afterward with the corresponding vertical louver (9) By simply providing guide element (11), the mechanical forced linkage of the horizontal and vertical air guide systems provides the desired control curve for producing an outflow area (A) (FIG. 1) that avoids the roof area at the level of air state sensor (8).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle interior with the central jet of a heating and/or air-conditioning system located in a dashboard and having at least one outflow duct, said jet being in the outlet area of the outflow duct and having a movable horizontally aligned air guide system configured to be moved in a vertical direction and a vertically aligned air guide system configured to be moved in a horizontal direction for controlling the blowing direction, as well as an air state sensor located in a roof area of the interior for regulating the heating and/or air-conditioning system, wherein the horizontally and vertically aligned air guide systems are operatively linked with one another by a mechanical forced guide element so as to constitute means for controlling the horizontally aligned air guide system's vertical and horizontal movement of the air guide systems such that it sweeps a maximum blowing area that avoids the roof area provided with an air state sensor wherein the guide element is mounted on a pivotable air guide element of the vertical air guide system and has a helical rise curve abutting one edge of an air guide element of the horizontal air guide system.

* * * * *